Aug. 16, 1955  R. CARTER  2,715,307

CUTTER BAR FOR MOWING MACHINES

Original Filed Oct. 4, 1950

INVENTOR
RAYMOND CARTER, DECEASED
BY HAZEL CARTER AND
RAYMOND HUGH CARTER,
ADMINISTRATORS.

BY

United States Patent Office 2,715,307
Patented Aug. 16, 1955

2,715,307

CUTTER BAR FOR MOWING MACHINES

Raymond Carter, deceased, late of Wyoming, Ill., by Hazel Carter, Wyoming, and Raymond Hugh Carter, Chicago, Ill., administrators, assignors to Hotchkiss Steel Products Company, Bradford, Ill., a corporation of Illinois Original application October 4, 1950, Serial No. 188,373. Divided and this application March 25, 1952, Serial No. 278,427

3 Claims. (Cl. 56—295)

The present invention relates to a cutter bar for use in mowing machines wherein the cutter bar rotates about a vertical axis with respect to the mowing machine, the application being a division of co-pending application Serial No. 188,373, filed October 4, 1950, entitled "Mowing Machines."

As pointed out in the above mentioned application, together with application Serial No. 156,897, filed April 19, 1950, for "Cutting Bar for Mowing Machines," a serious problem has existed, in that when a cutter bar of this type strikes a hard object or the like in its path, the blade portion becomes damaged. To overcome this objectionable feature, the blade portion is secured to the supporting member by a pair of spaced apart pins or the like, one of which is adapted to be sheared off when the blade hits an obstacle, thereby enabling the blade to swing beneath the cutter bar to prevent injury thereto and, in addition, to assist in moving the cuttings out of the way, the support is provided with a deflector or protuberance located adjacent the leading edge of the support behind the cutting blade, the protuberance serving to spread the cuttings uniformly over previously cut areas.

An important object of the present invention is to provide a support for cutting blades wherein a reinforced element is located on the leading edge of the support in proximity to the point of attachment of the blade to the support.

Another object of the present invention is to provide a cutter bar of the type rotatable about a vertical axis wherein the bar has means incorporated therewith to disseminate the cuttings uniformly over areas cut previously, thereby preventing the cuttings from twining on the cutter bar or mandrel.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which.

Figure 1:
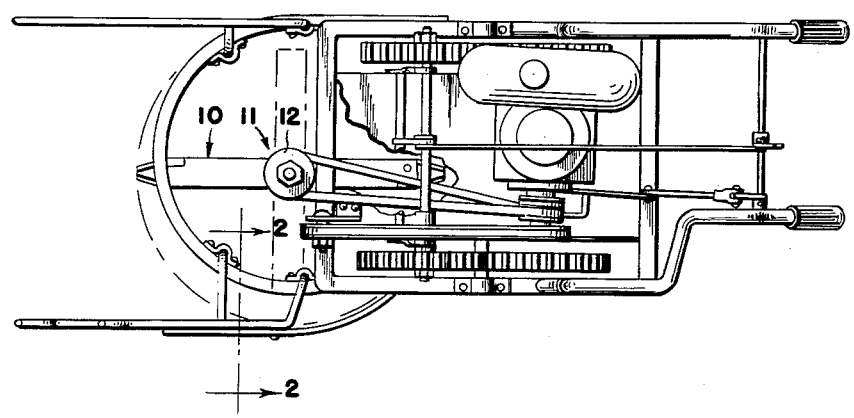
Figure 1 is a plan view of a mowing machine equipped with a cutter bar constructed in accordance with this invention.

As shown in the drawings, the cutter bar assembly comprises a horizontally disposed blade bar 10 suitably supported by a mandrel 11, the mandrel being conveniently attached to a mowing machine frame, the upper end of the mandrel having a pulley 12 adapted to be coupled to a complemental pulley operatively connected with the power source by means of a belt.

Figure 2:
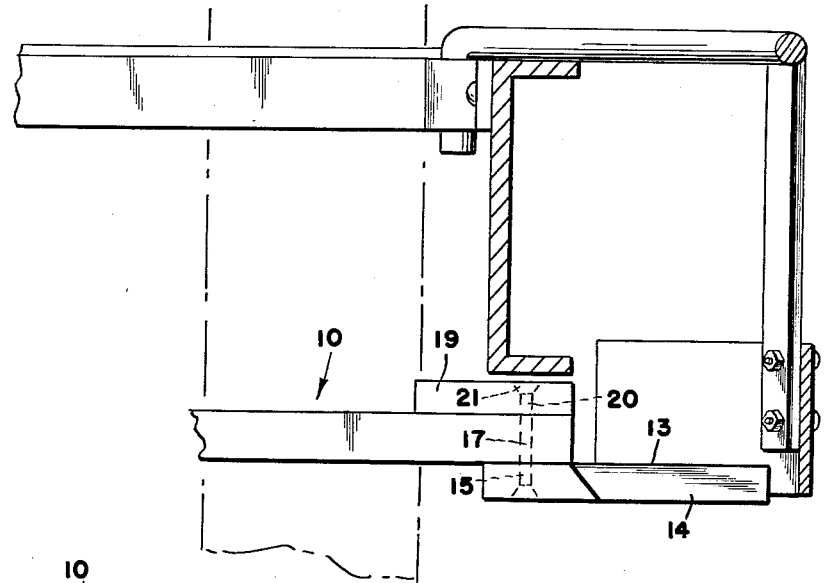
Figure 2 is a sectional view taken along the line 2—2 of Figure 1, the view looking in the direction of the arrows but being on a somewhat enlarged scale.
Figure 3:
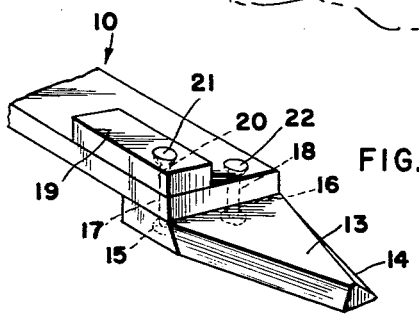
Figure 3 is a view in perspective of one end of the bar illustrating the deflector lug or protuberance mounted on the leading edge of the bar.

The cutter bar 10 is provided with a blade or cutting section 13 at each end thereof, and the blade or section is preferably triangular in plan, the side edges of which are bevelled, as shown at 14. As shown in Figure 2, the blade underlies the cutter bar and is provided with openings 15 and 16 adapted to register with corresponding openings 17 and 18 in the cutter bar. A lug or protuberance 19 is also carried by the upper flat face of the cutter bar in proximity to the leading edge of the bar immediately behind the blade 13.

The apertures 15 and 17 are of greater diameter than the apertures 16 and 18, and the lug 19 is also provided with an apertures 20 of the same diameter as the apertures 15 and 17 to receive a rivet or other securing device 21 in order to anchor the blade and lug to the cutter bar. A shear pin type rivet 22 is lodged in the apertures 16 and 18 and, as a consequence, if the blade 13 strikes an obstacle during the mowing operation, the pin 22 will be sheared off, whereupon the blade will shift horizontally beneath the bar 10, thereby preventing any damage to the blade. Manifestly, the shear pin may be quickly removed and replaced so that the cutter bar may be further employed.

The lug 19 located at the leading edge of the cutter bar 10 will function in the fashion of a deflector and thus tend to drive the cuttings to the right (Figure 1) and, as a result, spread the cuttings uniformly over the area which has been cut. This arrangement will positively prevent the cuttings from winding on either the cutter bar 10 or the mandrel 11, thereby insuring a clear travel path for the wheels of the mowing machine. The lug 19 may be said to work on the same principle as the drag tooth in a saw, that is to say, removing the portion that has been cut off. The cutter bar in its entirety is quite simple both as to structural detail and operation, and by virtue of the frangible connection between the bar and the cutter blade, the blade cannot be seriously injured during use and the lug serves to scatter the cut material, thereby insuring proper and efficient operation of the cutter bar, since there is little, if any, chance of weeds or grass becoming entangled either around the mandrel or the cutter bar.

This invention is not to be confined to any strict conformity with the showing in the drawing, but may be changed or modified so long as much changes or modifications mark no material departure from the salient features of the invention as expressed in the appended claims.

What is claimed is:

1. In a cutter bar for use with mowing machines wherein the bar is rotatable about a vertical axis comprising a support, a cutting blade on each end of the support, and a protuberance on the support adjacent the leading edge of the support to deflect the cuttings severed by the cutting blade.

2. In a cutter bar for use with mowing machines of the type wherein the bar is rotatable about a vertical axis, an elongated planar support, a cutting blade secured to the lower face of each end of the support, and a protuberance carried by the upper face of the leading edge of the support in proximity to the cutting blade to deflect the cuttings.

3. In a cutter bar for use with mowing machines of the type wherein the bar is rotatable about a vertical axis, a support, a cutting blade located at each end of the support, a protuberance at each end of the support adjacent the leading edge of the support and above the cutting blade, a rigid pivot connection between said cutting blade, protuberance and support, and a frangible connection between the blade and the support adjacent the trailing edge of the support of lesser cross-sectional area than the rigid connection so that the blade can swing beneath the support should the blade strike a hard obstacle, the protuberance serving to deflect the cuttings severed by the blade.

References Cited in the file of this patent

UNITED STATES PATENTS

| | | |
|---|---|---|
| 2,203,198 | Junge | June 14, 1940 |
| 2,484,511 | Ingalls | Oct. 11, 1949 |
| 2,578,880 | Doyle | Dec. 18, 1951 |
| 2,592,755 | Soenksen | Apr. 14, 1952 |